United States Patent Office 3,025,670
Patented Mar. 20, 1962

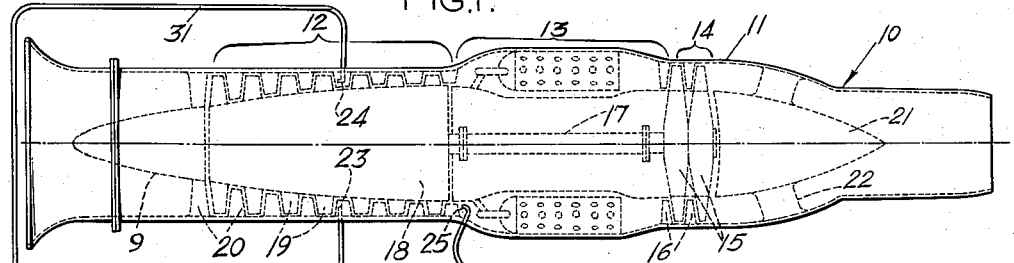

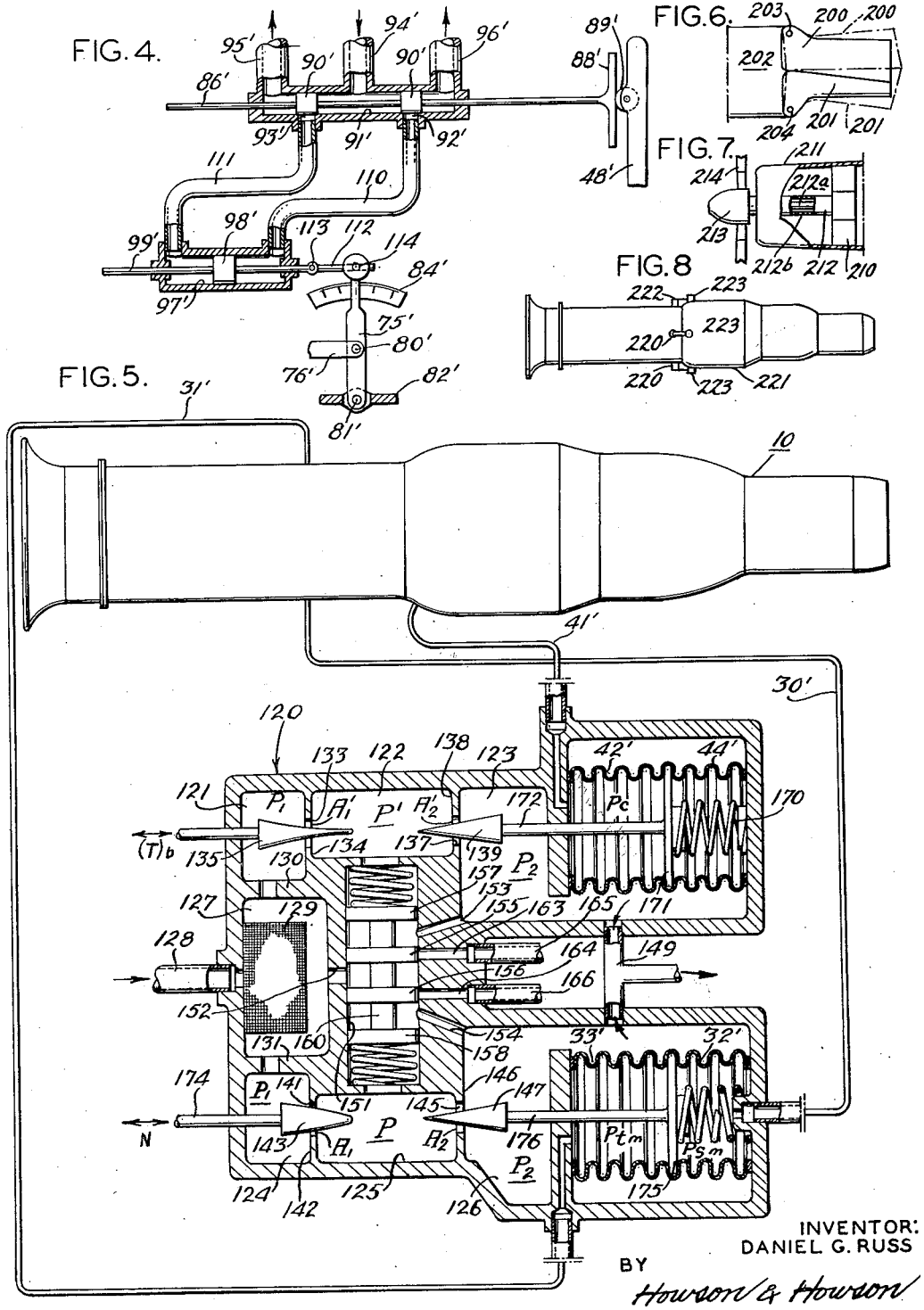

3,025,670
METHOD AND APPARATUS FOR DETECTING, MEASURING AND CONTROLLING THE TEMPERATURE OF GAS TURBINE ENGINES
Daniel G. Russ, 7417 Coventry Ave., Melrose Park, Pa., assignor of one-half to Allen S. Atkinson, McLean, Va.
Filed Mar. 7, 1957, Ser. No. 644,530
35 Claims. (Cl. 60—39.28)

This invention relates to a method of determining the temperature inside gas turbine engines without the use of temperature sensitive devices. This invention also concerns the method of detecting error between a desired or expected temperature level and the actual temperature of the engine. This error can, in turn, be used to control some temperature controlling variable associated with the engine in order to bring the engine temperature back to the desired temperature. Alternatively, the error can be used in the invention to nullify itself in a self-balancing system in order to obtain a new response which is a function of the actual temperature of the engine and hence a measurement of the temperature of the engine. This invention also concerns certain apparatus which is capable of operation in accordance with the method of the present invention.

At or near the full power rating of gas turbine engines, the temperature of the engine must be limited in order to protect the turbine and to insure a maximum operating life. This limitation of temperature must be consistent with development of the rated power levels of the engine under specified engine entrance temperature and pressure conditions. It is also desirable to measure and/or control temperatures below the maximum to obtain desired engine control or performance in regard to thrust levels or other requirements.

Consequently, if maximum engine efficiency and performance is to be had, it is necessary to be able to control and/or measure engine temperatures with good accuracy. Although it would appear that the direct and best method of detecting temperature levels is to provide direct temperature sensing elements in the turbine rotor blades themselves, there are many practical disadvantages to this sort of scheme. Consequently, it is usual to attempt determination of the gas temperature upstream or downstream of the turbine rotor and to approximate the temperature in the turbine from these temperatures. Thermocouples, the most commonly relied on temperature sensing elements because of the convenience which they afford in extracting signals easily from commercially provided engines, ordinarily do not withstand the severe heat, vibrations, and other conditions encountered in the upstream location, and are usually placed in multiple downstream in an effort to ease application problems and overcome distribution errors. The approximations involved are based upon a variety of assumed conditions so that error to some degree is usually present because of variation from these conditions and non-uniform flow conditions. In addition, because of the control complexity of additional gear required, i.e., amplifiers, a power supply, compensating circuits for responsiveness, etc., the overall system fails to be durable and reliable. Moreover, the responsiveness and/or accuracy of the thermocouples themselves sometimes must be compromised in order to make them sufficiently rugged for the application.

When thermocouple temperature regulating systems of the type above described are used, an auxiliary emergency hydro-mechanical system is frequently provided for added reliability. In fact, simple hydro-mechanical installations, based on principles recited in my U.S. Patent 2,441,977 and that of A. S. Atkinson 2,441,948, may be used to obtain a closed loop self-regulating temperature measurement or control system.

The present invention is based on the method of measuring air flow recited in these U.S. patents. The primary advantage of this method is that it permits a closed circuit or closed loop arrangement of a mechanical, hydraulic, or pneumatic variety whereby upon adjusting the system a particular temperature will be obtained, all other variables adjusting to produce this temperature. Thus, the method and its associated system do not rely on relatively unreliable and complex thermocouples and associated systems and no thermocouples need be used. Instead, a more reliable, simple, easily adjusted, easily manufactured and easily installed hydro-mechanical system of relatively light weight is substituted to operate with a degree of accuracy as good as the best present day thermocouple systems, and with much higher response. Moreover, the temperature obtained is a highly accurate measurement of the temperature at a particular desired location within the engine, usually one completely inaccessible by prior art techniques, and not merely a measurement of temperature difference across different parts of the engine or temperature change from one time to another.

The method of the present invention is directed to determination of temperature in a temperature-limited gas turbine engine. The method consists of detecting the difference between a specially directed total and static pressures within a compressor stage, as disclosed in my U.S. Patent 2,441,977 and that of A. S. Atkinson 2,441,948 and as subsequently applied to axial-flow compressors in the U.S. patent of A. S. Atkinson 2,711,073 and in Atkinson's application Serial No. 182,527, filed August 31, 1950, detecting the pressure in the combustor and detecting the speed of rotation of the compressor. The effects thus detected can be used in a variety of ways but they may be said to be generally used to produce responses which are functions of each of the detected effects, which is meant to include functions of combinations of detected effects, and the responses are then combined to produce another response which is a function of temperature. The combination is made to simulate a ratio of a product of the speed response and the combustor pressure response to the compressor pressure difference response.

Examples of combinations which are possible under the broadest conception of the method of the present invention are found in the following formulae:

$$\frac{N}{\sqrt{T}} = \frac{f_1(\Delta P)}{f_2(P_c)} \tag{I}$$

$$\frac{N}{\sqrt{T}} = f\left(\frac{\Delta P}{P_c}\right) \tag{II}$$

In each of the above cases, and in the material which follows, N represents the speed of rotation of the compressor, T represents the internal temperature of the engine, $\Delta P$ represents the difference of total and static pressure in the compressor and $P_c$ represents the pressure in the combustor. The differences in Equations I and II have a material effect on any structure selected as an analogue, but for most purposes either equation is sufficiently accurate for use in practical systems. Moreover, other forms of the basic equation are possible and it will be understood that the selection of these two forms is by way of example rather than limitation.

The method of the present invention will have greatest applicability in determining turbine temperature and/or temperature error in gas turbine engines. In determining temperature error, to repeat, the pressure in the combustor and the pressure differences in the compressor are detected, as is the speed of rotation of the compressor, and responses which are functions of each of the detected effects are produced. An adjustable temperature demand is also provided and all of the responses are combined in such a way that, in effect, the adjustable temperature demand response balances a ratio of the product of the speed response and the combustor pressure response to compressor pressure difference response. As a practical matter, the most convenient balancing effect may work out so that the temperature index is balanced against the ratio of pressure effects, or some other balancing of responses rather than the temperature demand response against all others. Thus, it is the idea of balancing or equating various combined responses rather than the exact nature of the combination which is important.

The practical use of the temperature error determination is in the regulation of temperature to maintain a temperature level pre-selected by the temperature demand or, alternatively, in the measurement of said temperature for purposes of temperature monitoring and/or manual control. In regulating the temperature, the error signal is used to modulate some engine control variable such as fuel flow, jet nozzle throat area, and/or some variable engine geometry in order to adjust this temperature to the demand level, i.e., to the level where the ratio of effects of speed and pressure in accordance with the above definitions of temperature balances the temperature demand. In using the temperature error to measure the temperature, on the other hand, the error signal is fed back so as to control the temperature demand automatically and to readjust a self-balancing system so as to nullify the error output and satisfy relationship (I) and/or (II) above. In this case, the position of the demand element, or any other variable directly dependent upon it, is a measure of the temperature. For either control or measurement purposes, it will be observed that what is being done is to reestablish conditions under which the formula of operation holds true. For control, the demand is arbitrary and the error signal operates on the engine to establish this condition via suitable control means; for measurement, the error signal operates substantially as an internal feed-back on the demand to establish the condition and the demand signal is an output measure of engine temperature, regardless of how the latter is controlled.

Apparatus in accordance with the present invention is directed toward determining temperature error from a selected temperature in a temperature-controlled gas turbine engine and/or in measuring engine temperature. It broadly consists of means for detecting the difference of particular total and static pressures in the compressor, as described in earlier patents and application of Russ and Atkinson hereinabove mentioned and herein described, means for detecting the pressure in the combustor and means for detecting the speed of rotation of the compressor. Response means is provided for responding to each of the detected effects and an arbitrary or automatically adjustable temperature demand balancing means is also provided. Means is then provided for combining the response means and the balancing means in such a way that, in effect, the temperature demand response balancing means tends to balance a ratio of the product of the speed response and the combustor pressure response to the compressor pressure difference response, the responses and/or the combination being arranged to provide any function required to produce the necessary balance. Usually any non-linearity required is introduced in combining the responses rather than in some complex response arrangement, however.

It will be observed that the method and apparatus of the present invention are dependent on mathematical relationships or formulae, a basic understanding of which is important to the present invention. Therefore, a discussion of the mathematical significance of the present invention will be undertaken on a relatively general basis before describing specific embodiments of the invention.

The method and apparatus of the present invention is based on the assumption that it is possible to measure air and/or gas flow in a gas turbine engine at two different stations in the flow path. The basis of obtaining pressures in the compressor was establishd in my patent and in patents and application of A. S. Atkinson above mentioned. A basic relationship made useful due to the developments associated with these patents might be expressed as $WN=\psi(\Delta P)$, where the $\psi$ function is frequently sufficiently linear to be replaced by a constant of proportionality, so that $WN=K(\Delta P)$ where W represents engine air flow, N represents the speed of the compressor and $\Delta P$ is the specific type difference in static and total pressure in the combustor described in the earlier patents and application. Specific methods of obtaining $\Delta P$ will be considered hereafter, it being sufficient to say at this stage that the stage at which the pressure differential is taken is not significant as long as excessive aerodynamic stall or choking is avoided. Consequently, it is usually preferable to measure the difference in total and static pressure in the intermediate to later stages of the compressor.

Just as information in the above formula is gathered at the compressor so information at the turbine inlet station leads to another expression, assuming that flow is at or near choked conditions, particularly under high speed operation. If this is so, then $$\frac{W\sqrt{T}}{P_c}=K_1$$

W, in this case, is technically the gas flow and will exceed the W of the compressor equations by the mass fuel fraction in non-bleed engines. $P_c$ should technically be turbine inlet pressure, which is somewhat lower than the compressor discharge pressure, but may be considered generally as the combustor pressure where heavy pressure losses in the combustor do not exist. There is a tendency for the errors in the quantities $P_c$ and W to cancel out in part and for residual error to remain constant so that it can be absorbed into the constant $K_1$ to a first approximation. Therefore, it is possible to consider W and $P_c$ as air flow and compressor discharge pressure, respectively. With these approximations, it is possible to combine the compressor and combustor formulae to eliminate W, and, solving for turbine temperature, the following equation may be had $$\sqrt{T}=K_2N\left(\frac{P_c}{\Delta P}\right)$$

A somewhat more general equation would retain the individual constants of the two equations combined as coefficients of the numerator and denominator of the fraction in the last equation. It has been shown experimentally that the last equation above applies over a more extended operational range than either the equation relating to the compressor or the equation relating to the turbine.

It will be observed that the last equation can be arranged to read $$\frac{K_2N}{\sqrt{T}}=\frac{\Delta P}{P_c}$$

From this equation, it will be observed that the left hand member is proportional to corrected turbine speed or to the corrected speed index, $$\frac{N}{\sqrt{T}}$$

The right hand member is a dimensionless pressure ratio. The overall relationship suggests strongly that, based on aerodynamic grounds, generalization is possible by replacing the constant $1/K_2$ by a non-linear function to give $$\frac{N}{\sqrt{T}}=f\left(\frac{\Delta P}{P_c}\right)$$

where the function is a function determined by engine characteristics. This equation provides a general approach to engine temperature measurement which is particularly convenient in obtaining turbine temperatures. A special case of this equation in which it is solved for temperature and its function is an exponential function can be represented as follows:

$$\sqrt{T} = K_3 \left[ \frac{NP_c^n}{(\Delta P)^n} \right]$$

where $n$ is a constant exponent, a special case of which is the linear relationship, $$\sqrt{T} = K_3 \frac{NP_c}{\Delta P}$$

where $n=1$. The linear or non-linear relationships expressed in these equations can be adapted to the method or apparatus of the present invention in accordance with the specific formula of operation of that particular device.

It will be observed that if the function in the general equation above is exponential or separable in nature, it is possible to rewrite that equation as follows:

$$\frac{N}{\sqrt{T}} = \frac{\phi_1(\Delta P)}{\phi_2(P_c)}$$

either one or both of which functions $\phi_1$ or $\phi_2$ might be non-linear.

From the above, it will be apparent that any number of expressions for the temperature, or a function of the temperature, and for the speed index can be had. Various embodiments of the invention embody different relationships for different purposes.

For a better understanding of the present invention, reference is made to the following drawings, in which:

FIG. 1 illustrates schematically the system of the present invention and shows how it is applied to a conventional gas turbine engine;

FIG. 2 is an axial sectional view taken through the gas turbine engine of FIG. 1 but showing only a narrow section of the engine in the region where the probes are made to extend into the compressor;

FIG. 3 is a view taken along section 3—3 of FIG. 2;

FIG. 4 shows a modified form of the system of FIG. 1 in which temperature error recorded is used not for regulation purposes but for temperature measurement purposes;

FIG. 5 shows an alternative pneumatic system for accomplishing the ends of the present invention;

FIG. 6 illustrates a means alternative to the speed control shown in FIG. 1 for correcting temperatures which in this instance is an exhaust jet nozzle having a variable area;

FIG. 7 shows another alternative means of temperature control by adjustment of the pitch of the propeller and a turboprop engine; and FIG. 8 shows still another alternative in the form of compressor blowout valves.

Referring to FIG. 1, a view of a gas turbine engine 10 as used for aircraft jet propulsion, for example, and associated control apparatus according to a mechanical embodiment of the present invention is shown without the detailed construction of a practical gas turbine engine. The cooperating relationship of engine 10 and the control apparatus is shown by schematic line connections. The control apparatus, which is shown in larger relative size than the engine, is partially schematic, partially sectional and intended only to be representative of a type of apparatus which might be used in an embodiment of the invention.

Referring first to the gas turbine engine 10 itself, within a casing 11 of general cylindrical form are arranged in axial succession an axial flow compressor 12, a combustor 13, and a turbine 14. These are the essential elements of any gas turbine engine although their arrangement and orientation may be quite different. For example, the axial flow compressor can be replaced by a radial or mixed flow compressor. The present invention is adaptable to any continuous flow gas turbine engine no matter what type of compressor, what type of combustor and what type of turbine is used.

In this particular case, the turbine 14 is composed of rotatable turbine discs 15 which are axially separated and between which are interposed fixed turbine blades 16 which are mounted on the casing 11. The blades 15 are mounted on a drive shaft 17 which may be supported in any conventional way by bearings mounted on the casing, by spiders, or other suitable structures. The drive shaft 17 supports and causes the compressor hub 18 to rotate. The nose cone 9 initially deflects the air entering the gas turbine engine into an annular stream and this annular stream flows into the compressor 12. In the compressor there are rotor blades 19, mounted on the hub 18 and stator blades 20 intermediate the movable blades 19 and mounted to the casing 11. A tail cone 21 supported by spider 22 maintains the steady stream in a proper flow to obtain jet energy from the engine efficiently.

In operation of the engine, the air entering the engine is deflected by the nose cone 9 into an annular stream and passes into the compressor; by virtue of the relative movement of the compressor blades, the air is compressed and preheated when it reaches the combustor 13. Fuel is introduced at the combustor and burns in the combustor in order to produce gases which flow through and expand to drive the turbine blades 16, which in turn impart rotational motion to shaft 17 and hub 18, and hence to the rotor blades 19 of the compressor.

As will be observed in FIGS. 2 and 3, as well as in FIG. 1, pressure sampling probes are introduced into the compressor. Theoretically these probes can be introduced almost any place within the compressor excepting perhaps the region of the first or last two or three blade stages so as to avoid excessive effects of aerodynamic stall or choke, respectively. They could alternatively be introduced in the turbine instead of the compressor with the same general effect, provided equations of the general type (I) and/or (II) above (see column 2, lines 48–53) are satisfied. In this location, the system is also independent of bleed-off air which could be extracted from the compressor discharge, and constitues an additional advantage. (The use of ($\Delta P$) pressure differential probes at turbine, instead of compressor stages, is considered within the scope and intent of this invention.) They are shown introduced within the stator blades, as will be seen in FIGS. 2 and 3, so as not to interfere with the rotation of the rotor blades and they are of two types; probe 23 is a probe designed to measure static pressure, while probe 24 is intended to measure the specific associated total pressure to satisfy the requirements of my Patent 2,441,977, those of Mr. A. S. Atkinson 2,441,948 and 2,711,073, and Mr. Atkinson's copending application Serial No. 182,527, filed August 31, 1950. Probe 24 is arranged so that its opening is both transverse and perpendicular to the stream. The axis of the end of probe 24 is located coincidental with that fluid velocity vector which is the geometric mean of the tangential fluid velocity component and that fluid velocity component which is both perpendicular to the tangenetial component and in a plane defined by the resultant of the velocity vector and the tangential component. Ordinarily this requires an L shaped or equivalent directional impact probe, arranged as shown in FIG. 3 and FIG. 2. The static pressure is obtained by a straight probe whose opening lies parallel to the flow so that it is affected only by the static pressure and not by the effect of the flow itself.

A probe 25, similar to the total probe 24, but placed to obtain the total impact pressure, is introduced into the combustor at the compressor discharge region. While probes 24 and 23 measure the total and static pressure in a compressor stage, probe 25 measures the compressor discharge total pressure, which is also approximately equal with the absolute turbine inlet total pressure and essentially interchangeable therewith. Probe 25 may be placed practically anywhere within the combustor as the pressure therein varies very little from one end to the other. It is advantageously placed, however, in the general location shown. Since the total or impact pressure at the compressor discharge is usually not far different than the static pressure level in the combustor region, a static pressure measurement in this region should prove equally satisfactory. For convenience, the pressure measured by probe 25 is termed "combustor pressure" herein.

The probe 23 is connected to a pressure line 30 which feeds a bellows 32, and probe 24 is connected to a pressure line 31 which feeds bellows 33. If distribution is poor, it is possible to have more than just one of each type of probe 23 and 24, and additional probes may be distributed around on the engine, all at the same axial level and in the same stage; keeping the probes at the same level is desirable for accuracy and averaging of flow conditions, if more than one probe is used for each bellows. The probes of any one type may be connected into a manifold and a single line fed to the bellows.

Bellows 32 is mounted on wall portion 34 which is part of the reference frame of the system. Bellows 33 is likewise mounted on wall 35 which is also part of the reference frame and is fixed relative to the portion on which bellows 32 is mounted. Bellows 32 is connected at its movable end to a stem 36 and bellows 33 is connected at its movable end to a stem 37. Stems 36 and 37 oppose one another and both are connected to lever 38. Because of the rigid connection of the free ends of the bellows to one another in opposed relationship, the reaction of the bellows on the lever 38 is proportional to the difference in pressure affecting the bellows 33 and the bellows 32. Lever 38 is pivoted at fulcrum point 39, which is adjustable in a manner which will be described later.

Probe 25 is connected by means of bleeder line 41 to a bellows 42. Again probe 25 may represent a plurality of similar probes arranged around the engine, preferably at the same axial level and engine station, all of these probes being connected into a common manifold in line 41. Bellows 42 is mounted on wall 43, which is also a fixed part of the reference frame structure. Opposed to bellows 42 is a bellows 44 mounted on a wall 45 which is also part of the frame. The free ends of these two bellows are opposed to one another and are interconnected by stems 46 and 47 by which they are connected to lever 48. The bellows 44 is an evacuated bellows offering negligible resistance to the pressure of bellows 42 but provided to balance out the ambient pressure surrounding both bellows externally. The stems 46 and 47 provide a pivot point which is fixed but along which the lever 48 is movable in a lengthwise direction, because of a lengthwise slot. One end of the lever is connected by pivot 49 to a speed sensing mechanism, generally designated 50.

The speed sensing mechanism employs a plurality of weights 52 each mounted on a separate crank 53 at the end of one arm thereof. These generally L shaped cranks 53 are pivotally connected at their respective elbows 54 to rotatable member 55 and are arranged so that the weights may swing radially outward and upward to larger radii as the speed of rotation of rotatable member 55 is increased. The rotatable member 55 is supported on a tubular member 56 which is part of the supporting frame structure of the device, like the walls 34, 35, 43, and 45 on which the bellows are mounted. The rotatable member 55 is connected to this tubular member by ball bearings 57 which permit easy relative rotational movement but no axial movement between the two members. The outer surface of the rotatable member 55 is provided with gear teeth 60 which mesh with a gear 61. Gear 61 is part of a take-off generally designated 62 which is connected to the drive-shaft 17 via suitable accessory gearing of the engine in order to drive the wheel 55 at a speed proportional to the speed of the engine. The ends of the cranks 53 opposite from those which are occupied by weights are provided with rollers 63 and these rollers cooperate with a cam 64, the surface 65 of which is provided with a contour which produces a change in the elevation of cam 64 proportional to the speed which cause the weights 52 to rise by centrifugal action as the speed of rotation of member 55 increases. A rod 58 is connected at one end to cam 64 and at the other end to the lever 48 by the pin 49. The rod 58, which passes upwardly through the tubular sleeve 56, is provided with rollers 59 which engage the inner surface of the sleeve and maintain its alignment. The spring 66 between the cam member 64 connected to shaft 58 and the frame 67 opposes the action of the rollers 63 on cranks 53 under the effect of speed produced by centrifugal force to establish an equilibrium position dependent on speed level.

It will be apparent that the action of the speed control device 50 is such that as the speed of the drive shaft 17 of the engine increases the speed of the rotatable member 55 will be increased. This, in turn, will cause the weights 52 to rise and spread radially outwardly causing the cranks 53 to rotate so as to cause rollers 63 to depress cam member 64. This, in turn, will cause a withdrawal of member 58 causing a pull on fulcrum point 49 and increasing the lever arm between it and the point of application of force by stems 46 and 47.

On the other side of the structure is a temperature request lever 70 which supports fulcrum point 39. This temperature request lever 70 is guided in a linear direction by guide 71 and is forced upward by spring 72 cooperating between temperature request lever 70 and a portion of the frame structure 73. The action of the spring on the temperature request lever is opposed by a pilot's temperature demand lever arrangement, generally designated 74, which cooperates with a contoured cam on the temperature request lever. The pilot's demand lever assembly consists of a pilot's lever 75 itself, a linkage 76 bearing a roller 77 which cooperates with the aforesaid cam surface 78 on the temperature request lever 70. The linkage 76 is directed and held in place by a guide 79 and is connected by a pivot 80 to the pilot's lever 75. The pilot's lever is connected by a pivot 81 to the frame, the lever supporting portion of which is designated 82. Movement of the lever is controlled manually at knob 83. The pilot's demand lever cooperates with a quadrant 84 on the frame which may be calibrated in terms of engine demand temperature.

Interconnecting levers 38 and 48 is a servo piston rod 86. Piston rod 86 is joined to lever 38 at a pivotal connection 87 which lies between the force application point at which stems 36 and 37 are connected to the lever and fulcrum point 39. The other end of the piston rod 86 is terminated in a planar surface 88 against which a roller 89 on lever 48 is caused to bear. This roller lies beyond the force-supplying bellows 42 and its axial position may be adjusted by lengthwise movement of the lever 48, in response to the lengthwise adjustment of the pivot point 49 produced by speed changes. On the servo piston rod are a pair of piston type valves 90 which cooperate in valve-like relationship with the cylinder 91 to keep closed an opening 92 and an opening 93, respectively, in the walls of cylinder 91. Intermediate the pistons 90 is a supply line 94 and outside of the pistons' closed positions are supply lines 95 and 96 feeding the cylinder 91. If the supply line 94 is a relatively low pressure supply, then the supply lines 95 and 96 are relatively high pressure, or vice versa. For proper action and direction in the mechanism shown, let us say that the high pressure line is line 94 and that the low pressure lines are lines 95 and 96. The openings 92 and 93 communicate with a cylinder 97 in which rides piston 98 which carries the drive rod 99.

In this instance, the drive rod 99 regulates the position of a metering valve in the fuel line fuel flow being one of the controlling variables whch may be adjusted to vary temperature. In this case, one end of the drive rod 99 carries fuel metering valve 100 which is located on the other side of wall 101 from the piston 98. The other end of the drive rod also passes through a wall and these walls provide bearings. Metering valve 100 cooperates with an orifice 102 to vary the size of the orifice, thus controlling the fuel that flows from chamber 103 to 104 arriving at chamber 103 through line 105 from the fuel supply tank and leaving chamber 104 through line 106 to the fuel injection nozzles in the combustor: the fuel line conducting this flow to the engine is omitted. It will be seen that, if the pistons 90 are moved to the left, the high pressure from line 94 will flow through port 93 and low pressure to line 96 will permit flow of fluid out of the cylinder 97 on the opposite side of piston 98 driving it to the right and closing fuel valve 100. Contrary motion of the pistons, i.e., to the right will cause an opposite effect. Accordingly, it will be apparent that the balance maintained between the levers and linkages of the system and their opposition to one another through servo piston rod 86 determine the balance of the system. Thus, if the pressure at one location changes, adjustment will occur until pressure effects are equalized. The major effect, however, is to produce temperaure control by adjustment of lever 83. The positioning of lever 83 in a real sense controls the temperature which may be directly selected from suitable calibrations on quadrant 84. Throttle lever 75 may conjointly be arranged to demand another engine power variable, such as engine speed, by separate but simultaneous control of another independent controlling means, such as the jet nozzle throat area, but the present invention is concerned with temperature control and measurement and additional functions of an overall control system are omitted for clarity.

It should be mentioned that the servo piston arrangement described is just one of many error responsive devices which might be used with apparatus of the present invention. The control of the fuel metering valve likewise illustrates only one of the many possible control arrangements for adjusting of the temperature. Other possibilities for controlling the temperature are compressor blow-off valves (FIG. 8), variable exhaust jet nozzle (FIG. 6), variable pitch propellers in a turbo-prop engine (FIG. 7), adjustable compressor inlet stator vanes and any other adjustable geometry capable of independently affecting the controlled or measured temperature in the engine. It will be appreciated by those skilled in the art that many of such control approaches are available and fall within the scope of the present invention. FIG. 6 illustrates highly schematically an arrangement whereby the area of the exhaust nozzle may be changed in the way shown. This is accomplished by constituting the nozzle exhaust portion of the jet engine of two semicylindrical members 200 and 201 which are suitably pivoted to the engine casing 202 by parallel pivot means 203 and 204 so that they may be opened to the dashed line positions or to intermediate positions to change the effective area of the output nozzle. It will be understood that the error output means drives suitable linkages to move the semicylindrical members 200 and 201 about their pivots and it will be further understood that the amount of movement required has been exaggerated and the structure shown is highly schematic. FIG. 7 is also a highly schematic showing representing a situation in which the pitch of a variable pitch propeller in a turbo-jet engine is varied within the casing. Cooperating with the propeller drive shaft is a differential planetary system which moves an outer shaft relative to an inner shaft and thereby acts upon a gear mechanism designed to change the pitch of the propeller in a conventional manner. In this case the differential gearing system 210 is mounted within the casing 211 to cooperate with the propeller shaft 212 which preferably has inner and outer portions 212a and 212b which act upon suitable gearing in the propeller hub 213 to cause the pitch of the propeller blades 214 to vary. FIG. 8 is intended to illustrate a jet engine provided with ports 220 in its casing 221 in the region of the compressor which are normally closed by covers 222 which may be spring loaded into closed and sealing position. Actuation means 223 acts upon these closures through suitable linkages in response to error output signals to open the ports and reduce compressive pressure. The pressure may be controlled by controlling the amount of opening achieved or by controlling the number of ports which are opened at a given time.

In operation, the pilot's demand lever 75 is positioned reltative to quadrant 84 which may be calibrated in temperature and its adjustment causes a corresponding adjustment of temperature request lever 70 through cam surface 78 as cam follower 77 permits this adjustment under compressive force of spring 72. This adjustment establishes the position of the fulcrum point in a slot in lever 38. The lever 38 is held in fixed position by its connection between the pressure bellows 32 and 33 and, since these bellows in their arrangement actually simulate the difference in total and static pressure within the compressor, this difference is, in effect, the force which acts on the lever through piston rod 86 and which is dependent upon the location of fulcrum point 39. Opposing the pressure of the pressure difference in the compressor is the pressure of the combustor, due to pressure exerted by bellows 42, the effect of which is varied by adjustment of the level of the application of its pressure by adjustment of the level of the fulcrum 49 in response to speed effects. Thus, it can be said that the speed control mechanism 50 biases the combustor pressure mechanism in a way to simulate the product of the combustor pressure times speed. By the same token, the lever 38 combines the effects of the demanded temperature and the difference of pressures in the compressor. When balance occurs in the system, the demanded temperature will obtain, because of the biasing effect of the movable fulcrum point 39 on the compressor pressure differential $\Delta P$. Temperature will thus be maintained at the demand level. Moreover, the effect of adjustment of the temperature demand lever 75 is to cause an unbalance between the differential pressure in the compressor and the total combustor pressure as biased by the speed and opposed by the force effected by the temperature demand response. This unbalance of the actuator causes an adustment in the fuel flow, which, in turn, changes engine conditions until the condition of balance dictated by the control system and specifically the pilot's temperature demand are satisfied. The specific changes undergone by the engine depend upon the engine and the total functional demands of the entire control system, inclusive of the temperature demand; the subject invention will control to achieve the temperature demand whether the engine is under transient or steady speed conditions and whether, in general, speed, pressure, and/or air flow change alone or concomitantly.

Referring now to FIG. 4, a temperature system similar to that shown in FIG. 1 is pictured. Parts which correspond to parts of the structure in FIG. 1 have identical numbers with the addition of primes thereto, and parts which are not pictured may be assumed to be the same as those shown in FIG. 1. Here again, the actuator responsive to temperature error indications is a servo-piston system in a cylinder 91' and a pair of servo pistons 90' which normally close openings 92' and 93'. Upon any deviation in temperature from that corresponding to the demand setting, the pistons will shift to one side or the other depending on the error direction. Movement to the left (as shown), for example, will cause flow of fluid from fluid supply 94' through ports 93'. Flow will move outwardly from the other port 92' through fluid pressure relief line 96'. A shift of the pistons in the other direction will cause flow from supply 94' through port 92' and thence through port 93' and relief line 95'. Again fluid through ports 92' and 93' flows into cylinder 97' to actuate a piston 98' which drives a rod 99'. Piston moves in the direction it is urged by the inward flow of fluid from the fluid pressure supply.

In this case, however, fluid must flow through extended lines 110 and 111 from ports 92' and 93', respectively, and the demand lever 75' is not pilot actuated but is actuated instead by the rod 99'. Actuation comes through a connection rod 112 connected to rod 99' by a pin 113. Connection rod 112 is, in turn, connected to lever 75' by a pin 114. Thus, it will be observed that, in this case, the actuation is used to change the position of the temperature demand lever and, in effect, rebalance the system by repositioning the demand to correspond with the actual engine temperature. Since it is so, it is obvious that, if the quadrant 84' is properly calibrated in temperature, the position of the lever 75' with respect to it is an indication of actual temperature. Hence, this arrangement provides an accurate measurement of temperature as opposed to an accurate regulation of temperature to a demanded temperature. With this type of measurement system, the adjustment of fuel demand and blow-off ports or propeller pitch in turbo-prop engines or variable exhaust jet nozzle throat area opening or any other temperature controlling variable or any combination of variables to some degree may be accomplished to correct the temperature to the desired level by manual control, if desired. Alternatively, the position of lever 75' or of any of the gear directly connected, such as 99', 98', 76', etc., provide a measure of temperature for monitoring or observational purposes.

It will be appreciated also that the temperature regulating device or the closed loop control device of FIG. 1 also in a sense is a measurement of temperature error in that the temperature demanded is the temperature which the engine must supply in order to provide the balanced conditions in which no error is indicated and in which, therefore, the actuator seeking to rebalance the system is not energized. The alternatives that exist between measurement and regulation are really the alternatives of adjusting one side of the equation to correspond with the other, one side of the equation representing the demanded temperature and the other side representing actual temperature expressed in terms of pressure and speed. When adjustment is made of demanded temperature, it amounts to an unbalance calling for a rebalancing of the actual temperature to equal the new value of demanded temperature. The mechanism employed is adjustment of a temperature controlling variable which effectively accomplishes readjustment of engine conditions in order to produce the temperature demanded. When measurement of temperature occurs, on the other hand, the demanded temperature is automatically readjusted until it equals actual temperature and a reading thereof supplied. In this latter sense, the mechanism serves as a temperature sensor or computer.

Many other systems other than the mechanical linkage and lever system of FIG. 1, and the many variations of that structure, will occur to those skilled in the art. There are predominantly hydraulic and pneumatic systems as well which effectively accomplish the same ends. In most of the systems, the effects of pressure in the combustor, pressure difference in the compressor, and speed in the compressor are combined in some way to represent actual temperature and balance an empirical force representing temperature demanded or requested. Any manner of coupling together responses to achieve such balancing in accordance with one of the possible formulae is representative of the present invention and intended to be within its scope and spirit.

The system of FIG. 5 is another example of a regulator in accordance with the present invention, but based predominantly on a pneumatic approach. Pneumatic regulators of the type shown are dependent for their functioning on equations for series flow through two orifices. A variable pressure ratio $P_1/P_2$ is impressed across both orifices, where $P_1$ represents the (higher) supply pressure and $P_2$ represents the (lower) exhaust pressure. If the series restrictions have effective areas $A_1$ and $A_2$, and $P$ is the intermediate pressure developed when the same air flow passes through these restrictions, then $P=P_1A_1/A_2$ when sonic flow exists in both. It is assumed that the temperature level is not altered by any heating or cooling effect on the flow from external sources. If corrected flow per unit area is denoted by a function "$f$" of the pressure ratio across the area, then $$P = \frac{P_1 A_1}{A_2} \frac{f\left(\frac{P_1}{P}\right)}{f\left(\frac{P}{P_2}\right)}$$

when sub-sonic flow exists in restrictions $A_1$ and $A_2$. These latter flow equations may be applied in a "bridge" arrangement of two separate flows to operate on opposite sides of an error generator, i.e., the same general flow equations may be applied (with primes on P and area designations) to temperature demands or requests as for to actual temperature. Then for sonic flows, $$P' = \frac{P_1 A_1'}{A_2'}$$

and for sub-sonic flows, $$P' = \frac{P_1 A_1'}{A_2'} \frac{f\left(\frac{P_1}{P'}\right)}{f\left(\frac{P'}{P_1}\right)}$$

Under conditions where equilibrium or zero error occurs, $P=P'$. Under these conditions $$f\left(\frac{P_1}{P}\right)=f\left(\frac{P_1}{P'}\right) \text{ and } f\left(\frac{P}{P_2}\right)=f\left(\frac{P_1}{P_2}\right)$$

so that an error generator null under sonic or sub-sonic conditions and, in fact, under any combination of such flows, corresponds to the basic relation $$\frac{A_1}{A_2}=\frac{A_1'}{A_2'}$$

Therefore all error generators operating on the above principle including linear type temperature computer and error generator devices such as that shown in FIG. 5 will operate satisfactorily whether flow is sonic or sub-sonic.

It will be observed that as a practical matter, it is important that the pressure level of $P_1$ does not have to be constant because its pressure supply may be dependent on engine speed or some other supply factor varying pressure. This reason accounts for the fact that the pneumatic controls of the type illustrated in FIG. 5 are built on the basis of "bridge" circuit principles and are consequently effective as long as the supply pressure $P_1$ is the same for both flow branches and provided the exhaust pressure $P_2$ is the same for both branches.

FIG. 5 shows schematically a gas turbine engine of the same type as that shown in FIG. 1 and parts similar to FIG. 1 are designated by primes. For example, the total pressure line 31' from the compressor leads to a bellows 33' and the static pressure line 30' from the compressor leads to bellows 32' which is opposed to bellows 33'. The compressor pressure line 41' leads to bellows 42' which is opposed by an evacuated bellows 44'. In other respects, except perhaps for the temperature demand levers and the speed sensor, neither of which are shown, this system differs from the mechanical system of FIG. 1. Structurally, the pneumatic mechanism consists of a casing generally designated 120 within which are a plurality of compartments. Within the casing wall are two series of pressure compartments arranged in parallel. One series, compartments 121, 122 and 123 are arranged to contain pressures $P_1$, $P'$, and $P_2$ under steady flow conditions. Compartments 124, 125 and 126 are arranged to contain pressures $P_1$, P, and $P_2$. Air flows into a compartment 127 through an intake conduit 128 and a filter 129. Thence, it may flow through non-restricted openings in walls 130 and 131 to chambers 121 and 124, respectively, so that it remains at pressure $P_1$. Flow from chamber 121 to chamber 122 must progress through orifice 133 in wall 134, the opening of orifice 133 being restricted by valve 135 to an effective area $A_1'$. Flow from chamber 122 to chambers 123 proceeds through an orifice 137 in the wall 138 and flow is impeded by the position therein of valve 139 which restricts the effective area of the orifice to $A_2'$. A similar situation is true in the case of flow through orifice 141 in wall 142 between chambers 124 and 125 and flow is restricted there by valve 143 which reduces the effective area of the orifice to $A_1$. Flow between chambers 125 and 126 proceeds through orifice 145 in wall 146 and flow is impeded by interposition of valve 147 into the orifice to adjust its effective area to $A_2$. Chambers 123 and 126 are exhausted through a non-restricted exhaust manifold 149 so that they are maintained under the common exhaust pressure $P_2$.

Extending between the chambers 122 and 125 is a cylinder 151 which has non-restrictive openings into each of these chambers. A central duct 152 opens into the side wall of cylinder 151 from chamber 127 and thereby provides access for pressure $P_1$ into the cylinder. A pair of ducts 153 and 154 extend between the cylinder 151 and the chambers 123 and 126, respectively.

The ducts 153, 152 and 154 are spaced axially along the cylinder 151. Within cylinder 151 between ducts 152 and 153 is a piston 155 closely embraced by the sidewalls and free to move within the cylinder but reasonably airtight with the cylinder. A similar piston 156 lies between the duct 152 and 154. Similar pistons 157 and 158 bracket the entire region of the cylinder into which the three ducts enter, leaving sufficient room for movement without arriving at the edges of the ducts 153 and 154 in their extreme positions. Connecting the pistons 155, 156, 157 and 158 is a rod 160 which holds these piston members relative to one another in the cylinder so that they all must move together.

It will be observed that in this construction, the pistons 157 and 158 provide like areas at opposite ends of cylinder 151 which are exposed to pressures P and P′ from chambers 125 and 122, respectively. In addition, light spring means may be interposed between each of the pistons and a shoulder on the cylinder wall in order to assure stability and null positioning to the structure.

It should also be noticed that in their balanced position pistons 155 and 156 close off ducts 163 and 164 which lead to control lines 165 and 166, respectively. If the pressure P exceeds pressure P′, the whole piston structure will be urged in the direction toward chamber 122, thus opening the ducts 163 and 164. The movement in this direction will leave duct 163 opened to pressure $P_1$ which causes fluid to flow in duct 152. At the same time, duct 164 will be opened to pressure $P_2$ which permits fluid being forced out of duct 164 to flow out through duct 154. Since there is a higher pressure in line 165 than in line 166, the higher pressure may be used to move a piston in a cylinder in much the same way that the piston 98 or 98′ is moved in cylinder 97 or 97′ in FIG. 1 or 4 respectively, in order to control some temperature controlling variable in the engine or in order to reposition a temperature demand lever, attached to valve 135 (temperature lever not shown).

On the other hand, should the piston structure be urged toward chamber 125, instead of toward chamber 122, pressure $P_1$ would cause a flow through duct 152 and duct 164 and through line 166 while duct 163 would be opened to pressure $P_2$ through duct 153. In this event, movement in the piston corresponding to piston 98 would be in the opposite direction.

By arranging the structure as shown, the movable valve 135 by its axial positioning adjusts the effective area $A_1'$ of orifice 133 in response to an actuation which is proportional to a function of demanded temperature. Valve 139 adjusts the effective area $A_2'$ or orifice 137 in response to the pressure effect of bellows 42′ against bellows 44′ and its associated spring 170 which imposes a load on plate 171 which provides a common wall between the bellows 42′ and 44′. Plate 171 which moves in response to changes in the relative pressures on its opposite faces drives a rod 172 which mounts valve 139 so that the effective position of that valve is dependent on some function of the pressure $P_c$. Similarly, valves 143 and 147, respectively, adjust the effective areas $A_1$ and $A_2$ of orifices 141 and 145, respectively. Valve 143 is adjusted through rod 174 in response to an actuation representing some function of speed. Valve 147 is adjusted in response to the difference in pressures in bellows 32′ and 33′, which difference positions plate 175 which, in turn, moves rod 176 supporting valve 147. Thus, the difference $\Delta P$ of the pressures $P_T$ and $P_s$ determines the positioning of valve 147.

It will be seen that flow will be from chambers 121 and 124 to chambers 123 and 126, respectively, and is limited by the various valves which change the effective areas of the orifices. At a null condition, where $P=P'$, the effective areas of the orifices will be such that $A_1'=C_1(\sqrt{T_d})$ and $A_2'=C_2(P_c)$, $A_1'=C_3N$, $$A_2'=C_4(\Delta P)$$

Therefore, $$\sqrt{T_d}=\left(\frac{C_2C_3}{C_1C_4}\right)\left(\frac{NP_c}{\Delta P}\right)$$

which will be recognized as the equation for determination of temperature derived above. Any departure from the conditions of this equation will indicate error and will induce the actuation, previously described, which will be arranged to correct the error. Depending on whether the C's are constants or functions, the equation is linear or non-linear, as desired.

It will be observed that the valves are contoured differently. A true conical shape indicates a linear function if linear or axial movement is proportional to the activating signal, whereas a curved contour represents a non-linear function. Thus it will be observed that by shaping the valves according to a particular function, the orifice will have its opening adjusted in accordance with that function, even if it is non-linear. Moreover, any non-linearity in response to an effect transmitted to a valve can likewise be linearized in this way, for example, the effect of speed with flyball sensors comes in as a squared effect and, by parabolic contouring of the valve, the area may be varied proportionally to speed. Thus, the valve shapes roughly correspond to the cam shapes in the mechanical structure.

It is furthermore to be appreciated that the measurement function, as well as the control function, is an inherent feature of the invention, regardless of structure. For example, in the predominantly pneumatic structure of FIG. 5, it is possible, as exemplified in the predominantly mechanical structure of FIG. 1 by the alternative structure of FIG. 4, to feed back the error signal so as to adjust automatically the temperature demand mechanism and obtain a displacement thereof which is a measure of the actual engine temperature. Thus, in FIG. 5, the pressure difference developed as an error signal between the ducts 165 and 166 may be fed back to activate the valve 135 and to adjust the area $A_1'$ so as to nullify the pressure difference $P'-P$ and remove the error. In this case, the area $A_1'$ and/or the position of valve 135 and associated direct connected linkage would be a measure of the existing engine temperature. Alternatively, the pressure difference $P'-P$ itself may be fed back in a similar way to nullify itself, balance the system and set up a position of valve 135 which is a measure of temperature, etc.

While a single mechanical structure and a single pneumatic structure have been described, it will be appreciated by those skilled in the art that many other structures of the mechanical and pneumatic variety can be produced in accordance with the present invention. Moreover, types of structures other than predominantly mechanical and pneumatic, such as hydraulic or electrical, are possible, although electrical approaches are perhaps to be discouraged in the present state-of-the-art from the standpoint of reliability, as compared with the other structures. Lastly, it is possible to devise combined structures employing two or more of the above mentioned approaches rather than one predominantly, in order to obtain favorable design characteristics. All of these type structures are intended to fall within the scope and spirit of this invention.

I claim:

1. In a gas turbine engine, the method of determining temperature over the full range of engine temperatures comprising detecting the total pressure along a line coincidental with the geometric mean fluid velocity vector and static pressure along a line perpendicular to the geometric mean fluid velocity vector within the compressor or turbine and producing a signal representative of each, combining the signals to obtain a resultant signal representative of the differences of said pressures, detecting the pressure in the combustor and producing a signal representative thereof, detecting the speed of rotation of the engine rotor and producing a signal representative thereof, combining these signals to simulate a product of a function of speed times the ratio of a function of the combustor pressure to a function of the pressure difference in order to produce a resulting signal representative of a function of temperature.

2. In a gas turbine engine, the method of determining temperature over the full range of engine temperatures comprising detecting the total pressure along a line coincidental with the geometric mean fluid velocity vector and static pressure along a line perpendicular to the geometric mean fluid velocity vector within the compressor or turbine and producing a signal representative of each, combining the signals to obtain a resultant signal representative of the differences of said pressures, detecting the pressure in the combustor and producing a signal representative thereof, detecting the speed of rotation of the engine rotor and producing a signal representative thereof, and combining only these signals to simulate a product of speed times the ratio of a function of combustor pressure to a function of pressure difference in order to produce a resulting signal representative of a function of temperature.

3. In a gas turbine engine, the method of determining the turbine corrected speed index, i.e., the ratio of engine speed (N) to the square root of turbine entrance temperature $(\sqrt{T})$, over a full range of engine temperatures comprising detecting total pressure along a line coincidental with the geometric mean fluid velocity vector and static pressure along a line perpendicular to the geometric mean fluid velocity vector within the compressor or turbine and producing a signal representative of each, combining the signals to obtain a resultant signal representative of the differences of said pressures ($\Delta P$) detecting the pressure in the combustor ($P_c$) and combining the signals in the ratio of the pressure differences within the compressor to the pressure within the combustor to produce a signal representative of the corrected speed index.

4. In a gas turbine engine, the method of determining the turbine corrected speed index, i.e., the ratio $$\frac{N}{\sqrt{T}}$$

of engine speed (N) to the square root of turbine entrance temperature $(\sqrt{T})$, over the full range of engine temperatures comprising detecting specific total pressures along a line coincidental with the geometric mean fluid velocity vector and static pressure along a line perpendicular to the geometric mean fluid velocity vector within the compressor or turbine and producing a signal representative of each, combining the total and static pressure signals to obtain a resultant signal representative of the differences of said pressures ($\Delta P$), detecting the pressure in the combustor ($P_c$), and combining the signals in a ratio of a function of the aforementioned pressure difference $f_1(\Delta P)$ to a function of pressure in the combustor $f_2(P_c)$, i.e., $$\frac{f_1(\Delta P)}{f_2(P_c)}$$

5. The method of claim 4 in which the function $f_1(\Delta P)$ is a linear function, the function being selected so that $$\frac{N}{\sqrt{T}} = \frac{k_1 \Delta P}{f_2(P_c)}$$

6. The method of claim 4 in which the function $f_2(P_c)$ is a linear function, the function being selected so that $$\frac{N}{\sqrt{T}} = \frac{f_1(\Delta P)}{k_2 P_c}$$

7. The method of claim 4 in which the function $f_1(\Delta P)$ and $f_2(P_c)$ are both linear functions, the functions being selected so that $$\frac{N}{\sqrt{T}} = k\left(\frac{\Delta P}{P_c}\right)$$

8. In a gas turbine engine the method of measuring turbine inlet temperature over the full range of engine temperatures comprising detecting total pressure along a line coincidental with the geometric mean fluid velocity vector and static pressure along a line perpendicular to the geometric mean fluid velocity vector within the compressor or turbine and producing a signal representative of each, combining the signals to obtain a resultant signal representative of the differences of said pressures, detecting the pressure in the combustor and producing a signal representative thereof, detecting the speed of rotation of the engine and producing a signal representative thereof, and providing an adjustable signal which is a measure of turbine temperature, and combining the signals in such a way that, in effect, the ratio of the product of the signal due to speed and the signal due to pressure in the combustor to the signal due to the aforementioned pressure difference automatically balances the adjustable signal to provide a measure of temperature.

9. The method of regulating the turbine temperature of a gas turbine engine in accordance with claim 8 wherein the adjustable signal is arbitrarily selected as a turbine temperature demand and system unbalance or error is used to modulate a temperature controlling means to adjust engine conditions until turbine temperature is of such a value that the ratio of the aforementioned effects of speed, pressure, and pressure difference expressed in claim 4 balances the temperature demand.

10. In a gas turbine engine the method of measuring temperature in accordance with the method of claim 8 in which an error unbalance is used to readjust the adjustable temperature demand signal until the temperature demand is equal to the responses represented by the ratio of effects of speed, pressure and pressure difference expressed in claim 4.

11. Apparatus for determining temperature error from a selected demand temperature over the full range of engine temperatures in a gas turbine engine comprising pressure detection means for detecting total pressure along a line coincidental with the geometric mean fluid velocity and static pressure along a line perpendicular to the geometric fluid velocity vector in the compressor or turbine and means for detecting their pressure difference and producing a signal representative thereof, pressure detecting means for detecting the pressure in the combustor and producing a representative signal, speed detection means for detecting the speed of the engine rotation and producing a representative signal, transducer for converting at least one of the signals to another kind of signal so that all of the signals are of the same standard type, means for combining the signals of the same kind in the ratio of the product of the speed and the combustor pressure to the specific pressure differences in the compressor or turbine to produce a combined signal, an adjustable means for setting demand temperature to produce a signal of the standard type, comparison means for comparing the combined signal and the signal from the temperature demand means and producing an error signal in the event they differ, an error response means responding to the comparison means to detect any error signal and furnish an output signal indicating the degree of unbalance existing in such comparison.

12. Apparatus for maintaining a fixed temperature in a gas turbine engine over the full range of engine temperatures comprising an actuator coupled to means for correcting temperature and arranged to actuate such temperature correction means, a first pressure responsive system having a pressure response element positioned to respond to the difference in the total pressure along a line coincidental with the geometric mean fluid velocity vector and the static pressure along a line perpendicuar to the geometric mean fluid velocity vector in the compressor or turbine and to produce a signal representative of said difference, a second pressure responsive system having a pressure response element responding to the absolute combustor pressure and to produce a signal representative thereof, a speed responsive mechanism having a speed responsive element responding to engine speed and producing a signal representative thereof, transducer means for converting at least one of the signals to another kind of signal such that all signals are of the same standardized kind, means for combining signals of the same kind in the ratio of the product of the speed and the combustor pressure to the specific pressure differences in the compressor or turbine to produce a combined signal, a temperature analog component variously positioned to respond to different demand temperatures and producing a signal of the same standardized kind representative of the demand temperature, and means responsive to the combined signal and the temperature demand signal and providing an error detection device which produces an error signal when the combined signal and the demand temperature signal are not balanced, and means for feeding the error signal to the actuator so that the actuator will act on a temperature correcting means to correct the error.

13. Apparatus for measuring the temperature over the full range of engine temperatures in a gas turbine engine comprising a first pressure responsive system having a pressure response element positioned to respond to the difference in the total pressure along a line coincidental with the geometric mean fluid velocity vector and the static pressure along a line prependicular to the geometric mean fluid velocity vector in the compressor or turbine and to produce a signal representative thereof, a second pressure responsive system having a pressure responsive element positioned to respond to the absolute combustor pressure and to produce a signal representative thereof, a speed responsive mechanism having a speed responsive element responding to engine speed and producing a signal representative thereof, transducer means for converting at least one of the signals to another kind of signal such that all signals are of the same standardized kind, means for combining the signals of the same kind in the ratio of the product of the speed and the combustor pressure to the specific pressure difference in the compressor or turbine to produce a combined signal, an adjustable temperature analog component having an element variously positioned to respond to different demand temperatures and to produce a signal of the standard kind representative thereof, an actuator coupled to and driving the temperature analog component, an error response device responsive to a signal of standard kind to produce a signal for the actuator and coupled to the actuator to supply error signals thereto, and coupling means to couple together and compare the combined signal from the combined means and the demand signal from the temperaturre analog means with the error response device whereby when the signals are unbalanced an error signal will be produced to cause the actuator to drive the temperature analog component to a position indicating actual temperature.

14. The apparatus of claim 11 in which the adjustable means is fuel flow and regulation is achieved through actuation of a fuel flow control valve.

15. The apparatus of claim 11 in which the adjustable means is the exhaust jet nozzle area and regulation is achieved through apparatus provided for that purpose.

16. The apparatus of claim 11 in which the adjustable means is a propeller pitch in a turbo-prop engine, said means being adjustable through suitable linkage in the propeller support structure.

17. The apparatus of claim 11 in which the adjustable means is the opening of compressor blow-out valves, said opening being accommodated by suitable adjustment means.

18. The apparatus of claim 11 in which the means for coupling the elements together consists of a mechanical linkage system including levers and tie-rods.

19. The apparatus of claim 11 in which the structure coupling together the elements is hydraulic, coupling being had through suitable pressure effects.

20. The apparatus of claim 11 in which the coupling is accomplished by means of a pneumatic system in which the gaseous flow produces the inter-related coupling effects by providing adjustable metering valve restrictions in accordance with the effects to be coupled.

21. The apparatus of claim 11 in which sampling probes are arranged in the compressor to detect total and static pressure therein, at least one sampling probe is arranged in the combustor to sample the absolute combustor pressure, and each pressure sampled is detected by a pressure detecting bellows which is connected to its respective probe by a bleeder line.

22. The apparatus of claim 21 in which the bellows detecting the static pressure is opposed to the bellows detecting the total pressure in the compressor.

23. The apparatus of claim 22 in which the bellows detecting the combustor pressure is opposed to a bellows of fixed pressure and works against said fixed pressure bellows.

24. The apparatus of claim 23 in which lever linkages connect the bellows detecting the pressure difference in the compressor and the bellows detecting the pressure in the combustor to the actuator in opposition to one another so that one is balanced against the other.

25. The apparatus of claim 11 in which the means for setting demand temperatuare is a servo system containing a main piston in a cylinder, on the opposite sides of which piston are openings communicating with a second cylinder in which are arranged a pair of pistons which are arranged to maintain the same relative positions to one another during movement and which normally close the openings in opposite ends of the main cylinder, the second cylinder being fed by fluid supply lines providing two different fluid pressures, a single line of pressure lying between the two pistons and a pair of lines of the other pressure lying outside of the two pistons so that when the two pistons are moved in one direction high pressure will flow to one side of the main piston and low pressure to the other, and vice-versa.

26. In a gas turbine engine, a temperature error device usable over the full range of engine temperatures comprising a pair of chambers each having an inlet and an outlet orifice, a source of similar pressure at each inlet orifice and a source of similar lower pressure at each outlet orifice, valves in each of the orifices in order to adjust their effective areas, said valves being adjustable to vary the areas of the orifices in accordance with variations in the temperature demand, the pressure in the combustor, the difference between total pressure measured along a line coincidental with the geometric mean fluid velocity vector and static pressure along a line perpendicular to the geometric mean velocity vector in the compressor and engine rotor speed, respectively, the valve being contoured in accordance with the rate of variation required by their formula of operation for each variable represented so that no error exists when pressures in the two chambers are equal, and pressure difference sensing means coupled to the chambers to detect pressure differences indicating temperature error.

27. The structure of claim 26 in which the orifices in one chamber represent demanded temperature and combustor pressure whereas the orifices in the other represent speed and the difference between the total and static compressor pressure.

28. The structure of claim 27 in which the demanded temperature and speed orifices are represented by the respective inlet orifices.

29. The structure of claim 28 in which the error detection means is a piston device in a cylinder which extends between the two chambers, said piston being effective to control valves in error output ducts to indicate error by movement thereof due to pressure being higher on one side than on the other side of the piston, said valves controlling the pressure to a remote error responsive device through said error output ducts.

30. The structure of claim 29 in which the piston and valves consists of four inter-connected parallel piston discs, each of which is closely embraced by the cylinder side walls and which move in unison, the middle discs comprising the valves having a neutral rest position in which said middle discs close said error output ducts, one pressure duct leading to the cylinder between the two middle discs from one of the pressure sources and other ducts leading into the cylinder between each pair of end and middle discs from the other pressure source, so that upon movement of the piston in one direction, one of the error output ducts is connected to the higher pressure source and the other error output duct is connected to the lower pressure source and upon movement in the other direction said one error output duct is connected to the lower pressure source and the other error output duct to the higher pressure source.

31. The structure of claim 30 in which one pressure supply is the inlet orifice pressure supply and the other pressure supply is the outlet orifice pressure supply.

32. Apparatus for determining turbine inlet temperature over the full range of engine temperatures in a gas turbine engine comprising pressure detection means for detecting total pressure along a line coincidental with the geometric mean fluid velocity vector and static pressure along a line perpendicular to the geometric mean fluid velocity vector in the compressor or turbine and means for producing a signal representative of their difference, pressure detection means for detecting the pressure in the combustor and for producing the signal representative thereof, speed detection means for detecting the speed of engine rotation and for producing a signal representative thereof, means for combining the signals to produce a signal proportional to the product of a function of speed and the ratio of a function of the combustor pressure to a function of the pressure difference which is representative of a function of engine temperature, temperature indicating means producing an analog signal of the same type as the combined signal, means to compare the two signals and produce an error signal, and error correction means responsive to the error signal to drive the temperature indicating means to such a temperature indicating position that the analog signal balances the combined signal which is a measure of engine temperature.

33. In a gas turbine engine, apparatus for determining temperature over the full range of engine temperatures comprising means for detecting the difference between total pressure along a line coincidental with the geometric mean fluid velocity vector and static pressure along a line perpendicular to the geometric mean fluid velocity vector within the compressor or turbine and producing a representative signal, means for detecting the pressure in the combustor and producing a representative signal, means for detecting the speed of rotation of the engine rotor and producing a representative signal, means for producing signals of the same kind which are functions of each of the detected effects, and means for combining only these signals in the ratio of the product of the signal representative of speed and the signal representative of pressure in the combustor to the signal representative of the pressure difference in the compressor or turbine to produce a combined signal which is a function of temperature.

34. In a gas turbine engine, apparatus for determining the turbine corrected speed index (i.e., the ratio of engine speed [N] to the square root of turbine entrance temperature $\sqrt{T}$) over the full range of engine temperatures comprising apparatus for detecting the difference between total and static pressure ($\Delta P$) within the compressor or turbine and producing a signal representative thereof, detecting the pressure ($P_c$) in the combustor and producing a signal representative thereof, and means for combining the signals to produce a signal which is a function of the ratio of the pressure differences within the compressor or turbine to the pressure within the combustor, i.e.

$$\frac{\Delta P}{P_c}$$

35. Apparatus for regulating the turbine inlet temperature over the full range of engine temperatures of a gas turbine engine comprising pressure detection means for detecting total pressure along a line coincidental with the geometric mean fluid velocity vector and static pressure along a line perpendicular to the geometric mean fluid velocity vector in the compressor or turbine and for producing a signal representative of their difference, pressure detection means for detecting the pressure in the combustor and for producing a signal proportional thereto, speed detection means for detecting the speed of engine rotation and for producing a signal proportional thereto, means for combining the signals in the ratio of the product of the speed and the combustor pressure to the specific pressure difference in a compressor or turbine to produce a combined signal which is a measure of engine temperature, temperature selection means producing an analog signal of the same type as the combined signal, means to compare the analog signal and the combined signal including an error means to produce an error signal if the combined signal and temperature demand signal do not balance, and drive means for operating temperature correction apparatus responsive to signals from said error detection means and in response to these error signals to drive the temperature correction means in the direction toward the demanded temperature.

References Cited in the file of this patent

UNITED STATES PATENTS 2,638,993    Woodward    May 19, 1953

(Other references on following page)

UNITED STATES PATENTS

| | | |
|---|---|---|
| 2,641,105 | Drake | June 9, 1953 |
| 2,653,446 | Price | Sept. 29, 1953 |
| 2,688,314 | Holm et al. | Sept. 7, 1954 |
| 2,703,013 | Wildhack | Mar. 1, 1955 |
| 2,739,478 | Offner | Mar. 27, 1956 |
| 2,740,295 | Perchonok | Apr. 3, 1956 |
| 2,761,280 | Atkinson | Sept. 4, 1956 |
| 2,775,231 | Silver | Dec. 25, 1956 |
| 2,809,492 | Arkawy | Oct. 15, 1957 |

UNITED STATES PATENT OFFICE
CERTIFICATE OF CORRECTION

Patent No. 3,025,670                          March 20, 1962

Daniel G. Russ

It is hereby certified that error appears in the above numbered patent requiring correction and that the said Letters Patent should read as corrected below.

Column 6, line 62, for "tangenetial" read -- tangential --; column 10, line 15, for "reltative" read -- relative --; column 12, lines 29 to 33, lower right-hand portion of the equation, for "$f\left(\dfrac{P'}{P_1}\right)$" read -- $f\left(\dfrac{P'}{P_2}\right)$ --; column 19, line 9, for "demand" read -- demanded --.

Signed and sealed this 14th day of August 1962.

(SEAL)
Attest:

ERNEST W. SWIDER

Attesting Officer

DAVID L. LADD

Commissioner of Patents